Patented June 22, 1948

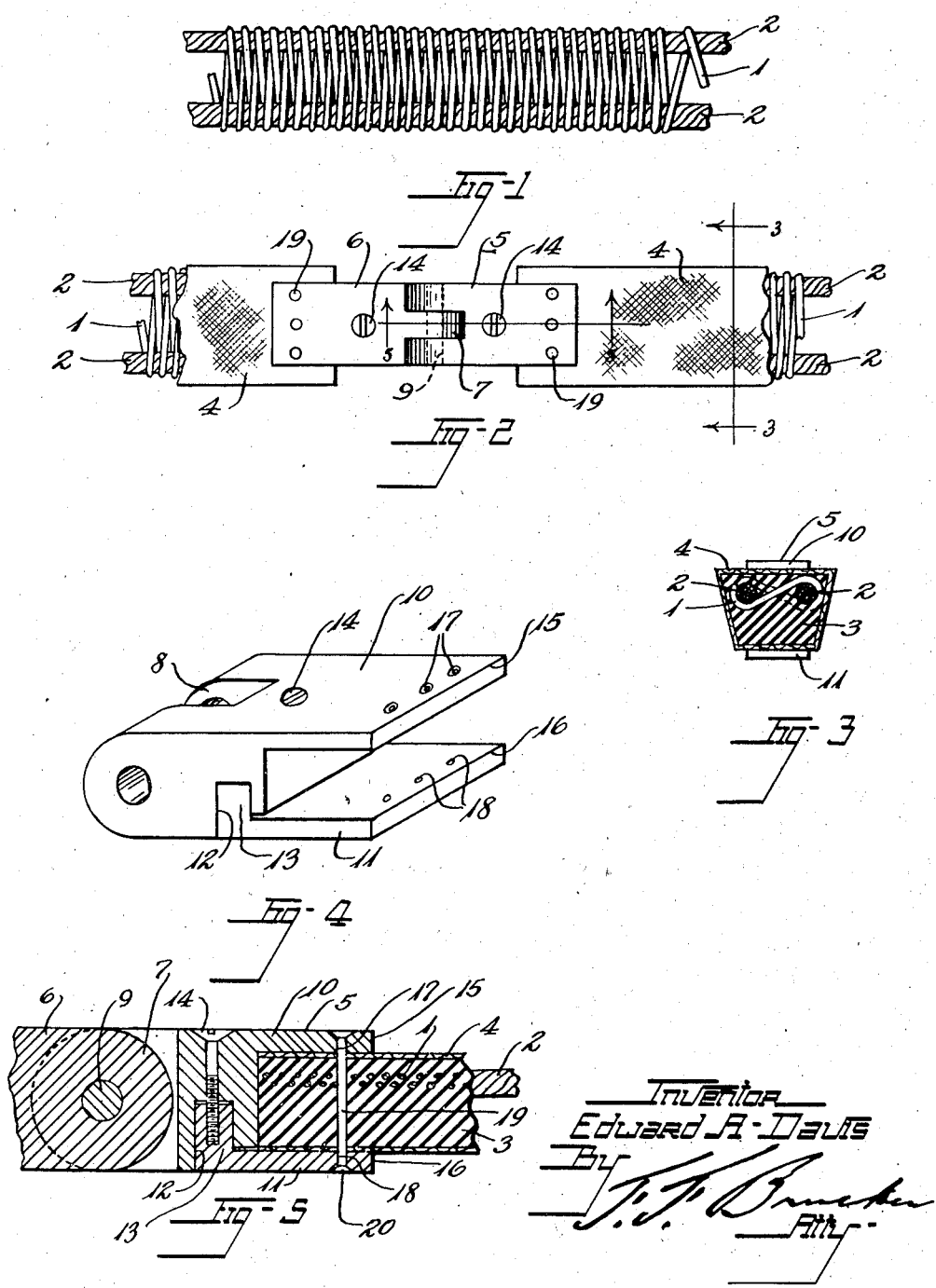

2,444,007

UNITED STATES PATENT OFFICE 2,444,007

POWER TRANSMISSION BELT

Edward A. Davis, Akron, Ohio, assignor to The B. F. Goodrich Company, New York, N. Y., a corporation of New York Application April 21, 1945, Serial No. 589,623

5 Claims. (Cl. 74—233)

This invention relates to power transmission belts having side-driving faces and is especially useful in side-driving trapezoidal or V-type belts comprising cable cores.

Side-driving belts having cable cores have exhibited in wide-spread service remarkably high power-transmission efficiency especially under heavy load and high speeds. Heretofore belts of this kind have been constructed with endless grommets of cabled cord and were, therefore, always manufactured of definite lengths. Although it has often been desirable to insert sections into V-belts of this character in order to replace damaged portions and to utilize continuous lengths of cable belt cut to any required length and formed into rings by uniting the ends, no method of belt construction nor of joining or connecting the ends has been devised to accomplish these aims without seriously reducing the flexibility, resistance to stretch and other merits of the endless cable grommet belt.

It is an object of the invention to provide a cable belt with cross reinforcements permitting attachment of belt connectors without undue stiffening of the belt while anchoring the cables to the belt connectors and to each other.

Other objects are to provide an open-ended V-belt construction possessing the advantages of parallel tension elements heretofore available only in the endless grommet construction, to provide for effectively connecting the belt ends despite the termination of the tension elements in the open end construction, and to accomplish these aims while retaining the flexibility and power transmission efficiency of endless grommet belts.

These and other objects will appear from the following description and the accompanying drawings in which:

Fig. 1 is a plan view of a belt tension structure constructed in accordance with and embodying the invention.

Fig. 2 is a plan view of a pair of belt ends constructed in accordance with and embodying the invention connected to each other, parts being broken away.

Fig. 3 is a section taken along the line 3—3 of Fig. 2.

Fig. 4 is a perspective view of a clamp constituting part of the belt connector.

Fig. 5 is a section taken along the line 5—5 of Fig. 2.

In all these figures the same numbers indicate identical elements.

In the embodiment of the invention here illustrated a flexible, inextensible reinforcing element such as a cord 1 of cotton, rayon, metal or other flexible material is wrapped in a figure 8 formation back and forth around parallel tension elements 2 along their entire length to provide loops of cord about the tension elements. In this embodiment the elements 2 may comprise cords of cotton, rayon, metal, or other flexible material wound in parallel helical convolutions about a loop of the cord to provide an endless grommet. If desired, however, element 2 may be made of a bundle of parallel strands of cord all under equal tension and twisted together. The cotton cord or other material is preferably rubberized prior to incorporation in the belt by passing it through a solution of rubber or a suspension of rubber in aqueous medium, and drying it under tension to reduce its extensibility. The rubber coating assists in holding the strands of cord in position relative to one another, furnishes an insulating cushion preventing rubbing of one cord upon another and serves also to unite the cord to the surrounding rubber material 3.

The assembly made up of reinforcing cords and tension elements 2 is built into a belt structure where it is embedded in a body 3 of rubber or other rubber-like material, and the usual fabric cover 4 may be applied before the assembled structure is vulcanized.

The reinforcing cord 1 extending laterally of the belt in loops, which engage about the tension elements 2 but freely extend from cable to cable across the belt, provides very little resistance to bending of the belt although due to its close engagement with the tension elements and the bond of rubber therebetween, provided by the cement or other coating, the resistance to displacement of the loops in the direction of the tension elements is relatively great so that they provide good anchorage for the ends of the elements, especially where belt connectors are to be attached to the ends of a belt. At the same time, the grip of the loops about the tension elements is increased by any tension on the reaches of the reinforcing element extending between the tension elements 2.

For uniting ends of belting thus constructed, any type of metal connectors which clasp an end of the belt and are secured by nails, rivets, or screws passing through the belt body may be used. The type here shown consists of two hinged connectors one of which is pictured in Fig. 4. The two mating connectors 5 and 6 differ only in that element 6 is formed with one knuckle 7, and element 5 with a pair of knuckles defining a groove 8 therebetween. The two connectors 5 and 6, are joined by a metal hinge pin 9 extending through holes provided in their knuckles for the purpose. When, in operation, the spliced belt passes around a pulley, elements 5 and 6 hinge about the pin 9. Each connector, as shown in Figs. 4 and 5, comprises a hinge member 10 and a clamp member 11. The hinge member has a cross groove 12 for receiving a cross tongue 13 of the clamp member.

A screw 14 extends through the hinge member 10 and engages a threaded hole in the clamp member 11 for drawing them together with their clamping lips 15 and 16 engaging the inside and outside surfaces of the belt end in clamping engagement therewith. Aligned apertures 17 and 18 are formed through the clamping lips, and pins 19 are driven through the belt end between the tension elements 2 and between the loops of the reinforcing element 1 and are secured by upsetting their ends, as at 20 to hold them in place. The engagement of the pins 19 behind the cross loops of the reinforcing element 1, anchors the connector to the tension elements 2 against relative slippage. The other end of belting to be joined is similarly inserted in the other connector member and the two connectors joined by means of pin 9 before or after the belt is placed around pulleys as circumstances may demand.

When the two clamps are secured together by pin 9 and tension is applied to the belt the reinforcing cord 1 prevents the pins 19 from tearing through the belt structure which without the cord 1 would possess insufficient shearing strength. The cord 1 furnishes firm anchorage from the pins 19; for not only is resistance to movement of the cord increased by the adhering rubber composition 3 in which it is embedded, but, when placed under tension by pressure of the pins against it, the cord binds more tightly around the cables 2 thus reducing the possibility of slippage lengthwise of the cables.

Modifications may be made without departing from the scope of the invention as it is defined by the following claims.

I claim:

1. A side-driving belt comprising a flexible two-ended body of trapezoidal cross-section including rubber-like material, a plurality of flexible tension members disposed side-by-side in spaced-apart relation between the side faces of said body and extending longitudinally thereof, cross-wrapping elements embedded in said body and extending from one tension member to the other in free reaches, connector pins in said body extending between said tension members and between reaches of said cross-wrapping elements to the exterior of said body, the construction and arrangement being such that pulling stresses on the pins in the longitudinal direction of the belt are distributed to said tension members and rubber-like material by said cross-wrapping elements, and connector means engaging said pins.

2. A side-driving belt comprising a flexible two-ended body of trapezoidal cross-section including rubber-like material, a plurality of flexible tension cables disposed side-by-side in spaced-apart relation between the side faces of said body and extending longitudinally thereof, cross-wrapping elements embedded in said body and extending from one tension member to the other in free reaches, connector pins in said body extending between said tension cables and between reaches of said cross-wrapping elements to the exterior of said body, the construction and arrangement being such that pulling stresses on the pins in the longitudinal direction of the belt are distributed to said tension cables and rubber-like material by said cross-wrapping elements, and connector means engaging said pins.

3. A side-driving belt comprising a flexible two-ended body of trapezoidal cross-section including rubber-like material, a plurality of flexible tension cables disposed side-by-side in spaced-apart relation between the side faces of said body and extending longitudinally thereof, cross-wrapping elements embedded in said body and extending from one tension member to the other in free reaches, a plurality of connector pins in said body at each end of the belt extending between said tension cables and between reaches of said cross-wrapping elements to the exterior of said body, the construction and arrangement being such that pulling stresses on the pins in the longitudinal direction of the belt are distributed to said tension cables and rubber-like material by said cross-wrapping elements, and connector means engaging said pins.

4. A side-driving belt comprising a flexible two-ended body of trapezoidal cross-section including rubber-like material, a plurality of flexible tension members disposed side-by-side in spaced-apart relation between the side faces of said body and extending longitudinally thereof, cross-wrapping elements embedded in said body and extending from one tension member to the other in free reaches, said elements being wrapped in figure of eight loops back and forth about the tension members in said rubber-like material, connector pins in said body extending between said tension members and between reaches of said cross-wrapping elements to the exterior of said body, the construction and arrangement being such that pulling stresses on the pins in the longitudinal direction of the belt are distributed to said tension members and rubber-like material by said cross-wrapping elements, and connector means engaging said pins.

5. A side-driving belt comprising a flexible two-ended body of trapezoidal cross-section including rubber-like material, a plurality of flexible tension cables disposed side-by-side in spaced-apart relation between the side faces of said body and extending longitudinally thereof, a reinforcing cord extending laterally of the belt in figure of eight loops back and forth about the cables as rung reinforcements embedded in said rubber-like material, connector pins in said body extending between said tension cables and between reaches of said cord to the exterior of the body, the construction and arrangement being such that pulling stresses on the pins in the longitudinal direction of the belt are distributed to said tension cables and rubber-like material, and connector means engaging said pins.

EDWARD A. DAVIS.

REFERENCES CITED

The following references are of record in the file of this patent:

UNITED STATES PATENTS

| Number | Name | Date |
| --- | --- | --- |
| Re. 20,479 | Freedlander | Aug. 24, 1937 |
| 1,420,962 | Breuer | June 27, 1922 |
| 1,874,628 | Roderwald | Aug. 30, 1932 |
| 2,029,381 | Merrill et al. | Feb. 4, 1936 |
| 2,114,517 | Apel et al. | Apr. 19, 1938 |
| 2,167,942 | Freedlander | Aug. 1, 1939 |
| 2,326,719 | Myers | Aug. 10, 1943 |